(12) United States Patent
Bervas et al.

(10) Patent No.: US 8,770,240 B2
(45) Date of Patent: Jul. 8, 2014

(54) TIRE WITH TREAD HAVING CIRCUMFERENTIAL GROOVES, RESONATORS AND INCISIONS

(75) Inventors: Patrick Bervas, Clermont-Ferrand (FR); Jean-Claude-John Faure, Mozac (FR); Hideaki Takano, Aichi (JP); Ludovic Greverie, Gunma (JP)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 996 days.

(21) Appl. No.: 12/812,420

(22) PCT Filed: Jan. 8, 2009

(86) PCT No.: PCT/EP2009/050182
§ 371 (c)(1),
(2), (4) Date: Oct. 4, 2010

(87) PCT Pub. No.: WO2009/095288
PCT Pub. Date: Aug. 6, 2009

(65) Prior Publication Data
US 2011/0017374 A1  Jan. 27, 2011

(30) Foreign Application Priority Data
Jan. 9, 2008 (FR) ................... 08 50107

(51) Int. Cl.
*B60C 11/12* (2006.01)
*B60C 11/13* (2006.01)

(52) U.S. Cl.
USPC ............ 152/154.2; 152/209.17; 152/209.21; 152/209.23; 152/DIG. 3

(58) Field of Classification Search
USPC ............ 152/154.2, 209.17, 209.18, 209.21, 152/209.23, DIG. 3
See application file for complete search history.

(56) References Cited

U.S. PATENT DOCUMENTS 6,408,910 B1 * 6/2002 Lagnier et al. ........... 152/209.17
2002/0166613 A1 11/2002 Radulescu
(Continued)

FOREIGN PATENT DOCUMENTS

EP 0 625 436 11/1994
EP 0 917 970 5/1999
(Continued)

OTHER PUBLICATIONS

Machine translation for Japan 2007-237816 (no date).*
(Continued)

Primary Examiner — Steven D Maki
(74) Attorney, Agent, or Firm — Cozen O'Connor

(57) ABSTRACT

Tire comprising a tread having a tread surface (11) and comprising a plurality of grooves (2) of generally circumferential orientation and of depth H, these grooves (2) defining a plurality of rubber elements (3, 30), at least one of which comprises a plurality of cavities (6), each cavity (6) of volume Vc of generally elongate shape with a total length Lc and being designed to communicate with a single groove (2) of generally circumferential orientation, each cavity (6) being extended all the way along its length Lc by an incision (80) which extends radially outwardly to emerge at the tread surface (11), this tire being such that the incision (80) comprises an incision portion (81) beginning at the cavity and forming an angle A of at least 10° with a line perpendicular to the tread surface and passing through the point of intersection of the incision with the cavity (6).

10 Claims, 3 Drawing Sheets

(56) References Cited

U.S. PATENT DOCUMENTS

2007/0051448 A1* 3/2007 Yumii ............... 152/209.18
2009/0165908 A1* 7/2009 Takahashi et al. ....... 152/209.18
2009/0165909 A1* 7/2009 Takahashi et al. ....... 152/209.18

FOREIGN PATENT DOCUMENTS

| EP | 0 989 000 | | | 3/2000 |
|----|-----------|---|---|--------|
| FR | 2 763 892 | | | 12/1998 |
| GB | 2329161 A | * | 3/1999 |
| JP | 2001-130227 A | * | 5/2001 |
| JP | 2007-237816 A | * | 9/2007 |
| WO | WO 02/38399 | | 5/2002 |
| WO | WO-2007-114383 A1 | * | 10/2007 |
| WO | WO 2007/114430 | | 10/2007 |
| WO | WO-2007/114430 A1 | * | 10/2007 |

OTHER PUBLICATIONS

Machine translation for Japan 2001-130227 (no date).*

* cited by examiner

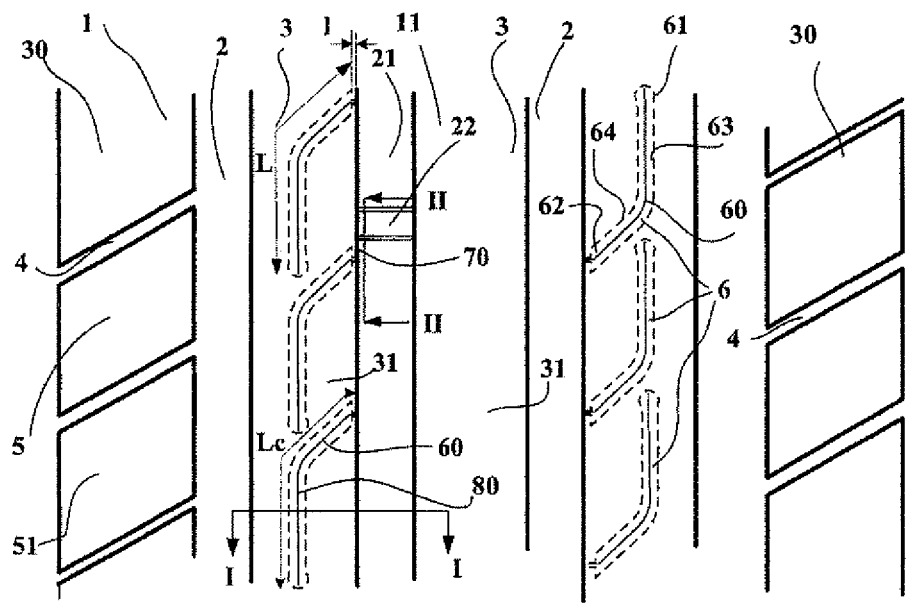
FIG. 1
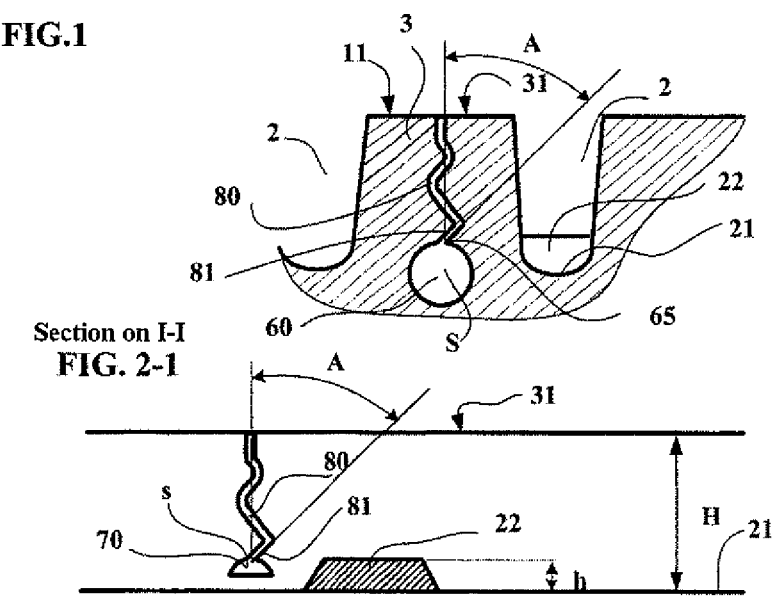
Section on I-I
FIG. 2-1
Section on II-II
FIG. 2-2

SECTION ON VI-VI

TIRE WITH TREAD HAVING CIRCUMFERENTIAL GROOVES, RESONATORS AND INCISIONS

RELATED APPLICATIONS

This is a U.S. national stage under 35 USC §371 of application No. PCT/EP2009/050182, filed on Jan. 8, 2009.

This application claims the priority of French application Ser. No. 08/50107 filed Jan. 9, 2008, the entire content of which is hereby incorporated by reference.

The invention relates to tires and more particularly the treads of such tires provided with means for significantly reducing rolling noise.

BACKGROUND OF THE INVENTION

Tires for passenger vehicles usually have a carcass reinforcement which in the great majority of cases today is radial; in this configuration the reinforcing elements of the carcass reinforcement are arranged to form an angle of greater than or equal to 80° with the circumferential direction (which amounts to saying that the reinforcing elements are either contained in a meridian plane—meaning a plane containing the axis of rotation—or form with this meridian plane an inclination of no more than 20°.

These tires usually have a crown reinforcement comprising a plurality of reinforcing elements embedded in an elastomer-based material. This crown reinforcement is covered radially outwardly by a rubber tread, and this tread has a surface, called the tread surface, which is designed to be in contact with the road as the tire rolls along.

To ensure an indispensable level of safety in rainy weather in particular, it is known practice to provide the tread with a plurality of grooves of generally circumferential (or longitudinal) orientation, and grooves of generally transverse orientation (parallel to or forming a small angle with the axis of rotation).

One problem with having longitudinal grooves is the generation of vibrations of the air moving along these grooves especially as they contact the road. These vibrations are the source of resonances which generate rolling noise.

Patent application publication JP-01-191734 examines this phenomenon and proposes reducing the noise generated by the air vibrating inside these grooves by forming within the thickness of the tread of a tire for a heavy vehicle, spherical cavities connected by a smaller-sectioned channel to a longitudinal groove. By this means it is possible to make a sort of resonator working on the principle of a Helmholtz resonator: such a cavity, because of its precisely determined volume, performs this function and reduces the effect of some of the frequencies of vibration of the air moving along the grooves as the grooves pass through the road contact patch. For each selected frequency, the volume of these cavities must be appropriate: the application to tires for a heavy vehicle is possible because, as a general rule, the tread elements are thicker than the tread elements of tires for passenger vehicles.

For a passenger vehicle, the tread is thin (that is, less than 10 mm), so it becomes essential to locate these resonators as far as possible from the tread surface of the tread and more particularly at a depth greater than the depth of the grooves, or at the very least at the depth of said grooves minus the legally required amount (indicated by the wear indicators which are pieces of rubber at the bottom of the grooves, the radially outward surface of which indicates the tread wear limit which should not be exceeded in order to maintain a satisfactory level of safety. While it would seem possible in the case of tires for heavy vehicles, as described in JP-01-191734, to mould and demould a tire with the mould elements moulding the hemispherical cavities, and these cavities communicating with the grooves, this becomes difficult with tires for passenger vehicles if only because of the great length of these cavities (the length being necessitated by the necessary volume).

Another problem with JP-01-191734 is that the large-volume spherical cavity can affect the way in which the rubber element containing it is compressed against the ground as the tire rolls along and in particular the distribution of the contact pressures. Also, the cavities of JP-01-191734 do not have a long enough life because after partial wear of the tread they become exposed on the tread surface, at which point the volume is no longer maintained and the resonator function is impaired.

SUMMARY OF THE INVENTION

One object of the invention is to provide an arrangement of cavities in a tire tread that is not only virtually unaffected by tread wear but can also be easily moulded and demoulded, while ensuring perfect control of the volume of each cavity in order to be able to function fully as a fixed-frequency resonator. "Virtually unaffected" here means that the volume of the cavities is unchanged until tread wear reaches ⅔ of the thickness of the said tread.

To this end, one aspect of the invention is directed to a tire comprising a crown part extended axially on each side by sidewalls, this crown part comprising a reinforcement made up of a plurality of reinforcing elements embedded in a rubbery material, this reinforcement being radially covered by a tread with a radially outward surface forming a tread surface designed to make contact with the road as the tire rolls along. This tread comprises a plurality of grooves of generally circumferential orientation and of depth H, these grooves defining a plurality of rubber elements arranged in the circumferential direction. At least one element of the tread comprises a plurality of cavities, each cavity of volume Vc being of elongate general shape with a total length Lc, each cavity being designed to communicate with a single groove of generally circumferential orientation, each cavity being extended all the way along its length L by an incision which extends radially outwardly to emerge at the tread surface.

This tire is characterized in that the incision comprises an incision portion beginning at the cavity and forming an angle A of at least 10° with a line perpendicular to the tread surface and passing through the point of intersection of the incision with the cavity, in such a way that the incision closes at least in the vicinity of the cavity in order to preserve the total volume Vc of said cavity as said cavity passes through the road contact region. This is because it is of the first importance to maintain a constant or at least an approximately constant volume for each cavity in order to actually obtain a resonator that will attenuate the sounds produced at a given frequency or in a given frequency range.

In an advantageous embodiment of the invention, each cavity of total length Lc behaves as a Helmholtz resonator and is formed by a first part of generally elongate shape of total length L and of average cross section S, and by a second part forming a channel of length l and of cross section s which is smaller than the average cross section S of the first part, this second part, which is connected to the first part, being designed to communicate with a groove of generally circumferential orientation. Each cavity is extended all the way along its length Lc by an incision extending radially outwardly to emerge at the tread surface.

In another embodiment of the invention, each cavity is a one-quarter wavelength type resonator. This embodiment is simple to produce because it requires a single cavity volume V and a cavity length Lc equal to the length of the resonator, this length being equal to one quarter of the wavelength which it is wished to act upon in order to attenuate the noise effects. It is also possible to provide cavities of different lengths Lc communicating with a common groove in order to attenuate noise pollution associated with multiple given frequencies of acoustic resonances created in said groove.

A tire according to an embodiment of the invention is provided with at least one wear indicator in the bottom of at least one groove, this wear indicator having a height h measured from the bottom of the groove, and each cavity comprises an upper generatrix situated at a distance from the tread surface greater than or equal to the depth of the grooves minus the height h of the wear indicator.

BRIEF DESCRIPTION OF THE DRAWINGS

Other features and advantages of the invention may be found in the description given below with reference to the attached drawings, which show embodiments of the subject of the invention by way of non-limiting examples.

FIG. 1 shows a partial elevation of the tread surface of a first variant of a tread according to the invention;

FIG. 2-1 shows a partial cross section on I-I through the tread shown in FIG. 1;

FIG. 2-2 shows a partial cross section on II-II through the tread shown in FIG. 1;

FIG. 3-1 shows a cross section of a variant of a Helmholtz resonator type cavity according to the invention;

FIG. 3-2 shows a cross section through the variant seen in FIG. 3-1 under the action of the contact pressures with the road;

DETAILED DESCRIPTION OF THE DRAWINGS

Figures 1, 3:
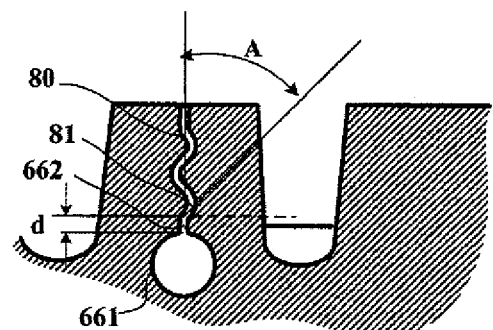

The tread 1 shown in a partial elevation with FIG. 1 comprises four main grooves 2 of circumferential (i.e. longitudinal) orientation, these grooves 2 being of approximately the same average depth H.

These grooves of circumferential orientation define three ribs 3 as well as edge parts 30. These edge parts of the tread are provided with oblique transverse grooves 4 defining, with a circumferential groove, a plurality of blocks 5. The outside surfaces 31 of the ribs and 51 of the blocks visible in this FIG. 1 form a tread surface 11 designed to make contact with the road as a tire provided with such a tread rolls along.

This tread also comprises a plurality of pieces 22 of rubber moulded on the bottom 21 of the circumferential grooves 2: these pieces of rubber are common devices used to indicate the maximum wear level of the tread, beyond which the tire must be changed. One of these pieces of rubber 22 is shown in section in FIG. 2-2: this piece of rubber has a height h measured from the bottom of the groove 2 of depth H.

Visible in FIG. 1 is a plurality of cavities 6 formed during the moulding of the tread. These cavities 6 are of elongate shape and are entirely within the tread. Each cavity 6, shown in dashes, forms a Helmholtz resonator of total length Lc and is formed by a first cavity part 60 of a total length L and of volume V, and by a second cavity part 70 of average cross section s and of length l, this second part 70 which is of smaller cross section than the average cross section of the first cavity part 60, communicating with a circumferential groove 2. The average cross section s of this second cavity part 70 is less than the average cross section S of the first cavity part 60. The respective volumes of the first and second cavity parts 6 are determined in a precise manner in order to attenuate the resonances in the groove at a frequency which is determined as a function of the length of groove in the road contact patch which in turn is a function of the load carried by the tire and its inflation pressure. "Cross section" here means the area of a transverse section through the cavity part considered.

Each first cavity part 60 comprises a circumferential part 63 oriented in the circumferential direction, this part having a closed end 61—that is to say not ending in free air—and an oblique part 64 having an end 62; this oblique part 64 is extended at one end by the cavity part 70 of reduced cross section communicating with a groove 2.

In this variant, all the cavities 60 formed on a given rib 3 communicate with a common circumferential groove 2 and are designed to limit the phenomena of resonance in said groove as it passes through the road contact patch.

Figures 2, 3:
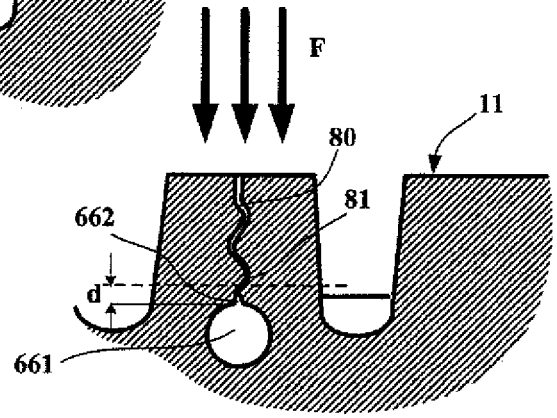

Each cavity 60, as FIG. 2-1 shows (depicting a cross section on the line 1-1 through the tread in FIG. 1), has a transverse cross section of circular shape of cross section S, in which the outermost (in the direction of the tread surface) points 65 of said cross section are at a distance D from the tread surface 11 which is greater than the difference between the depth H of the groove 2 and the height h of the piece of rubber 22. In this way it is possible to benefit from an anti-resonance effect throughout the period of use of the tread. However, provision could be made for the cavities 60 to appear on the tread surface after wear greater than or equal to ⅔ of the initial thickness of the tread. The cavities can thus by the end of their use form new grooves or at least form new ridges useful for increasing the grip of the tread on the road.

Each cavity 6, formed by the first cavity part 60 and the second cavity part 70 is extended all the way along its length Lc by an incision 80 extending radially outwardly to emerge at the tread surface 11; each incision 80 comprises an incision portion starting at the cavity and forming an angle A of at least 10° (in the present case the angle A is equal to 15°, with a line perpendicular to the tread surface and passing through the point of intersection of the incision 80 with the cavity 6, in such a way that the incision 80 closes at least in the vicinity of the cavity in order to preserve the total volume V of said cavity as said cavity 6 passes through the road contact patch. The incision 80 preferably has an average width of less than 1 mm and still more preferably less than 0.6 mm. Owing to this essential feature of the invention, it is possible to provide an anti-noise effect at pre-selected frequencies.

The first cavity parts 60 shown here have a circular cross section, but a transverse cross section of any other shape can of course be used. Likewise all the cavities shown in this first variant are basically identical geometrical features: it is of course possible for a person skilled in the art to optimize the dimensions of the cavities to control the noise generated by the movement of air in a groove, and the dimensions of other cavities to control the noise generated by the movement of air in another groove. Cavities communicating with a groove can be selected in such a way that some of them are effective at one particular frequency and the other cavities communicating with the same groove are effective at another frequency.

FIG. 2-2 shows a cross section through the tread depicted in FIG. 1 on a line II-II. In this figure there is a wall of material defining a groove of depth H, this groove having a piece of rubber 22 of height h (defining a legal wear limit for the tread). There is also the orifice of the second cavity part 70 communicating with the groove. This second cavity part 70 has a transverse cross section s of truncated circular shape whose surface area is less than half the transverse cross section of the first cavity part 60. This second cavity part is extended in the direction of the tread surface 31 by the incision 80, the join being represented by the incision part 81 forming an angle A with a line perpendicular to the tread surface. In the present case, virtually the entire volume Vc of the cavity 6 (equal to the sum of the volume of the first cavity part and the volume of the second) is radially below the level of the wear indicator, and consequently in this variant said volume Vc is not affected by the wear of the tread. This makes it possible to preserve the same cavity volume throughout the service life of the tire so that it remains effective at attenuating resonance-related noises in the grooves.

Industrially, it may be difficult to connect a blade moulding the inclined portion of the incision to a body for moulding a cavity, this body having a curved outer surface; to facilitate the implementation, the blade may be given a non-inclined incision part connected to the body at approximately right angles to said body. If this is done, the total useful volume Vc of the cavity also includes the volume of the non-inclined part of the incision, as FIG. 3-1 shows. As can be seen in this FIG. 3-1, showing a transverse cross section through a variant of the cavity, there is a circular section part 661 extended by a non-inclined incision part 662 for a height d. The useful volume of the cavity here includes the volume of the circular section part 661 plus the volume of the non-inclined incision part 662. The non-inclined incision part 662 is extended by the incision 80 and in particular by an inclined part 81 forming an angle A of more than 10°. FIG. 3-2 shows the same cavity when the tread is subjected to contact pressures against the road. Under the contact pressures (indicated by the arrows F), the cavity of volume Vc is isolated because the inclined incision part 81 extending said cavity closes, causing said volume Vc to be kept constant.

Figure 4:
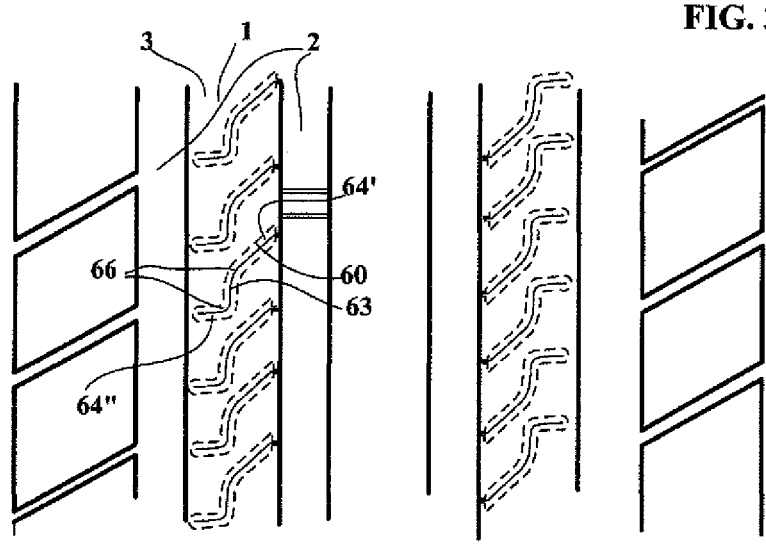
FIG. 4 shows another variant of a tread according to the invention.

In another variant shown with FIG. 4, the cavities comprise two bent parts 66 for optimal occupation of the tread. In the present case the first part of the cavity 60 comprises two parts of oblique orientation 64, 64', positioned on either side of the part oriented in the circumferential direction 63.

Figure 5:
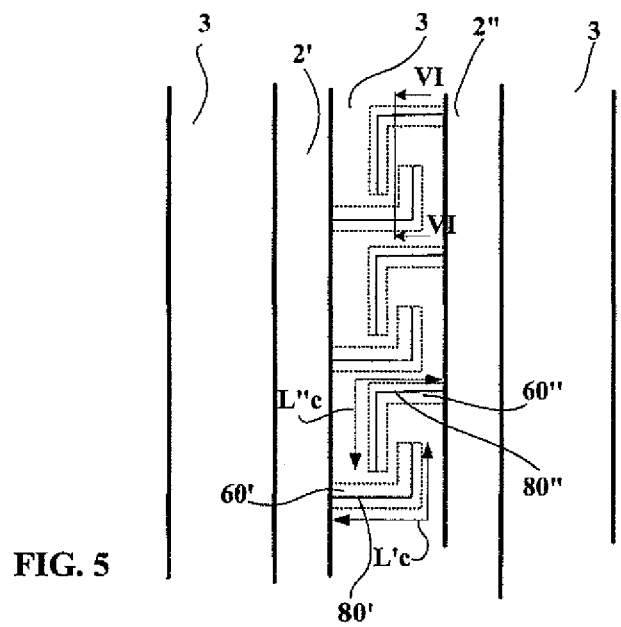
FIG. 5 shows another variant of a tread according to the invention in which the cavities are one-quarter wavelength resonators.
Figure 6:
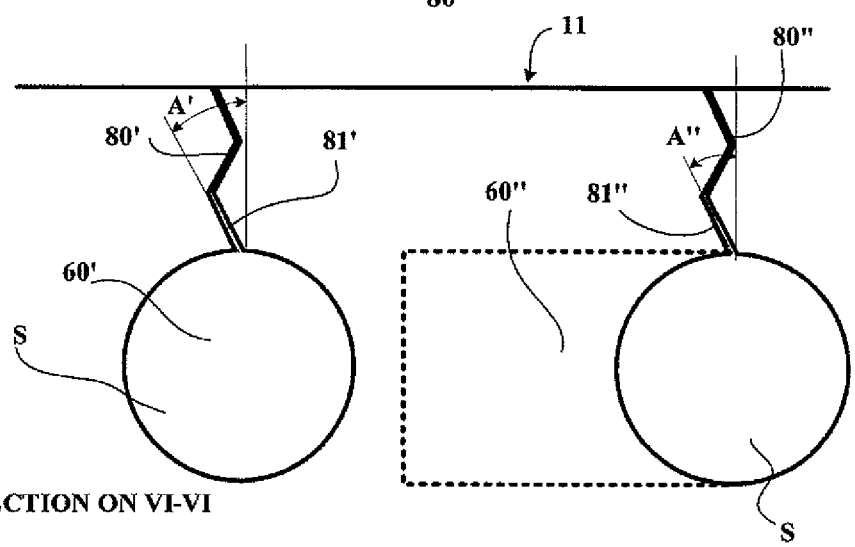
FIG. 6 shows a cross section on VI-VI through the tread shown with FIG. 5.

In another variant of the invention shown in FIG. 5, the resonators formed in a rib are one-quarter wavelength type resonators. Visible in this FIG. 5 are three ribs 3 defining grooves 2' and 2". Moulded into the rib 3 lying between the two grooves 2' and 2" are a plurality of cavities 60' of total length L'c and a plurality of cavities 60" of total length L"c. These cavities 60' and 60" are of constant cross section throughout their length. The cavities 60' communicate with the groove 2' in order to attenuate resonance noise generated in this groove 2', while the cavities 60" communicate with another groove 2" in order to attenuate resonance noise generated in this groove 2" by the movement of air as the tire rolls along. Each cavity 60' and 60" is of a generally elongate shape and forms a bend, giving a part which is elongate in the longitudinal direction and a part which is perpendicular to this longitudinally elongate part. The cavities 60' and 60" are arranged in such a way as to occupy the reduced space within the rib 3.

As may be seen in FIG. 4, shown in a cross section on a line VI-VI marked in FIG. 5, each cavity 60' and 60" is extended radially towards the tread surface 11 of the tread when new by an incision 80' and 80", respectively. The join between each incision 80', 80" and the cavity beneath it 60', 60", respectively, is represented by an incision part 81', 81", respectively, forming an angle A', A", respectively, with a line perpendicular to the tread surface, these angles being at least 10°. These incision parts inclined at an angle A', A" preserve the volumes of the cavities 60', 60" as the tire rolls along. The cavities 60' and 60" both have the same transverse cross section S but different volumes in the present case.

The invention is not limited to the examples described and illustrated, and various modifications can be made without departing from the scope of the invention. In particular the second cavity part 70 communicating with a groove may have a cross section of any shape. Each resonator can be made with specific dimensions incorporating in particular the deformations of the tread material. Another possibility is to provide resonators whose frequencies are staggered in such a way as to be connected for example to the pitches of the motifs of the tread. Likewise, what has been presented for tires intended for passenger vehicles can be applied to any other type of tire, including those intended for heavy vehicles.

The invention claimed is:

1. A tire comprising:
sidewalls; and
a crown part extended axially on each side by the sidewalls, this crown part comprising:
   a reinforcement made up of a plurality of reinforcing elements embedded in a rubbery material; and
   a tread that radially covers the reinforcement and having a radially outward surface forming a tread surface configured to make contact with the road as the tire rolls along, this tread comprising:
      a plurality of grooves of generally circumferential orientation and of depth H, these grooves defining a plurality of rubber elements arranged in the circumferential direction,
      at least one rubber element of the tread comprises a plurality of cavities, each cavity of volume Vc being of generally elongate shape with a total length Lc and configured to communicate with a single groove of generally circumferential orientation, each cavity being extended along its length Lc by an incision that extends radially outwardly to emerge at the tread surface,
   wherein each of said cavities form a Helmholtz resonator, each of said cavities comprising a first part of length L and of average cross section S and a second part forming a channel of length I having a cross section s less than the average cross section S of the first part, this second part being connected to the first part and communicating with a groove, and the volume Vc of the cavity being equal to the sum of the volumes of the first part and of the second part, and
   wherein the incision comprises an incision portion beginning at the cavity and forming an angle A of at least 10° with a line perpendicular to the tread surface and passing through the point of intersection of the incision with the cavity, such that the incision closes at least in the vicinity of the cavity to preserve the total volume Vc of said cavity as said cavity passes through the road contact patch.

2. The tire according to claim 1, wherein the first part of the cavity forming a Helmholtz resonator comprises a cavity part oriented in the circumferential direction.

3. The tire according to claim 2, wherein the first part of the cavity comprises, in addition to a part that is generally parallel to the circumferential direction, two parts that are generally of oblique orientation positioned on either side of the part that is oriented in the circumferential direction.

4. The tire according to claim 1, wherein the tread is provided with a wear indicator in the bottom of at least one groove, this wear indicator having a height h measured from the bottom of the groove, each cavity forming an Helmholtz resonator is entirely located at a depth at least equal to the depth of the grooves minus the height h of the wear indicator.

5. The tire according to claim 1, wherein the incision has an average width of less than 0.6 mm.

6. A tire comprising:
sidewalls;
a crown part extended axially on each side by the sidewalls, this crown part comprising:
  a reinforcement made up of a plurality of reinforcing elements embedded in a rubbery material; and
  a tread that radially covers the reinforcement and having a radially outward surface forming a tread surface configured to make contact with the road as the tire rolls along, this tread comprising:
    a plurality of grooves of generally circumferential orientation and of depth H, these grooves defining a plurality of rubber elements arranged in the circumferential direction,
    at least one rubber element of the tread comprises a plurality of cavities, each cavity of volume Vc being of generally elongate shape with a total length Lc and being designed to communicate with a single groove of generally circumferential orientation, each cavity being extended all the way along its length Lc by an incision which extends radially outwardly to emerge at the tread surface,
    wherein each of said cavities form one-quarter wavelength resonators, and
    wherein the incision comprises an incision portion beginning at the cavity and forming an angle A of at least 10° with a line perpendicular to the tread surface and passing through the point of intersection of the incision with the cavity, in such a way that the incision closes at least in the vicinity of the cavity in order to preserve the total volume Vc of said cavity as said cavity passes through the road contact patch.

7. The tire according to claim 6, wherein at least a cavity forming a one-quarter wavelength resonator comprises a cavity part oriented in the circumferential direction.

8. The tire according to claim 7, wherein at least a cavity forming a one-quarter wavelength resonator comprises, in addition to a part that is generally parallel to the circumferential direction, two parts that are generally of oblique orientation positioned on either side of the part that is oriented in the circumferential direction.

9. The tire according to claim 6, wherein the incision has an average width of less than 0.6 mm.

10. The tire according to claim 6, wherein the tread is provided with a wear indicator in the bottom of at least one groove, this wear indicator having a height h measured from the bottom of the groove, each cavity forming a one-quarter wavelength resonator is entirely located at a depth at least equal to the depth of the grooves minus the height h of the wear indicator.

* * * * *